United States Patent
Ganapathiappan et al.

(10) Patent No.: US 10,072,166 B2
(45) Date of Patent: Sep. 11, 2018

(54) INKS WITH LATEX POLYMERS HAVING IMPROVED PRINTING PERFORMANCE

(71) Applicant: Hewlett-Packard Development Company, L.P., Fort Collins, CO (US)

(72) Inventors: Sivapackia Ganapathiappan, Palo Alto, CA (US); George Sarkisian, San Diego, CA (US); David Michael Ingle, San Diego, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 12 days.

(21) Appl. No.: 15/318,864

(22) PCT Filed: Jul. 30, 2014

(86) PCT No.: PCT/US2014/048767
§ 371 (c)(1),
(2) Date: Dec. 14, 2016

(87) PCT Pub. No.: WO2016/018272
PCT Pub. Date: Feb. 4, 2016

(65) Prior Publication Data
US 2017/0130083 A1    May 11, 2017

(51) Int. Cl.
*C09D 11/107* (2014.01)
*C09D 133/00* (2006.01)
*C09D 11/38* (2014.01)
*C08F 220/02* (2006.01)

(52) U.S. Cl.
CPC .......... *C09D 11/107* (2013.01); *C08F 220/02* (2013.01); *C09D 11/38* (2013.01); *C09D 133/00* (2013.01); *C08F 2500/24* (2013.01); *C08F 2800/20* (2013.01)

(58) Field of Classification Search
CPC .... C09D 11/107; C09D 133/00; C09D 11/38; C08F 220/02; C08F 2800/02; C08F 2500/04
See application file for complete search history.

(56) References Cited

U.S. PATENT DOCUMENTS

| | | |
|---|---|---|
| 5,028,651 A | 7/1991 | Park et al. |
| 5,192,366 A | 3/1993 | Nishioka et al. |
| 6,627,364 B2 | 9/2003 | Kiguchi et al. |
| 6,764,173 B2 | 7/2004 | Chen et al. |
| 7,381,755 B2 | 6/2008 | Wang et al. |
| 8,113,732 B2 | 2/2012 | Shima et al. |
| 8,133,415 B2 | 3/2012 | Yu et al. |
| 8,258,204 B2 | 9/2012 | Ganapathiappan et al. |
| 2003/0119938 A1 | 6/2003 | Wang et al. |
| 2011/0097497 A1* | 4/2011 | Ganapathiappan ....... C08F 2/22 427/256 |
| 2012/0026238 A1 | 2/2012 | Ganapathiappan et al. |
| 2012/0092427 A1 | 4/2012 | Ganapathiappan et al. |
| 2013/0021406 A1 | 1/2013 | Stoeva et al. |

FOREIGN PATENT DOCUMENTS

EP    1035179    9/2000

OTHER PUBLICATIONS

International Search Report dated Apr. 24, 2015 for PCT/US2014/048767, Applicant Hewlett-Packard Development Company, L.P.

\* cited by examiner

*Primary Examiner* — Robert D. Harlan
(74) *Attorney, Agent, or Firm* — HP Inc. Patent Department

(57) ABSTRACT

A printing ink having improved printing performance is provided. The ink includes either a latex polymer derived from a monomer having an olefinic group and from about 1 to 10 wt % of N-phenylmaleimide or a latex polymer having a narrow particle size distribution that has a standard deviation of less than about 6% of average particle size, or both. The ink may be continuously printed for more than 1 hr without crusting.

16 Claims, 5 Drawing Sheets

INKS WITH LATEX POLYMERS HAVING IMPROVED PRINTING PERFORMANCE

BACKGROUND

There are several reasons that inkjet printing has become a popular way of recording images on various media surfaces, particularly paper. Some of the reasons include low printer noise, capability of high-speed recording, and multi-color recording. Additionally, these advantages can be obtained at a relatively low price to consumers. However, although there has been great improvement in inkjet printing, accompanying this improvement are increased demands by consumers in this area, e.g., higher speeds, higher resolution, full color image formation, increased stability, more permanent images, etc.

In general, inkjet inks are either dye- or pigment-based inks. Both are typically prepared in a liquid vehicle that contains the dye and/or the pigment. Dye-based inkjet inks have been a dominant technology in the inkjet ink arena. However, as many dyes are water-soluble, images printed using many of such dye-based ink jet inks are not as water-fast as may be desirable. The water-fastness of an anionic dye-based inkjet ink printed on media has been shown to be enhanced by overprinting or underprinting the printed image with a fixer fluid including cationic material. Thus, when the cationic polymer and the anionic dye contact one another on a substrate, a reaction between the dye and the cationic material creates an image with improved water-fastness and permanence.

DETAILED DESCRIPTION

Figure 1:
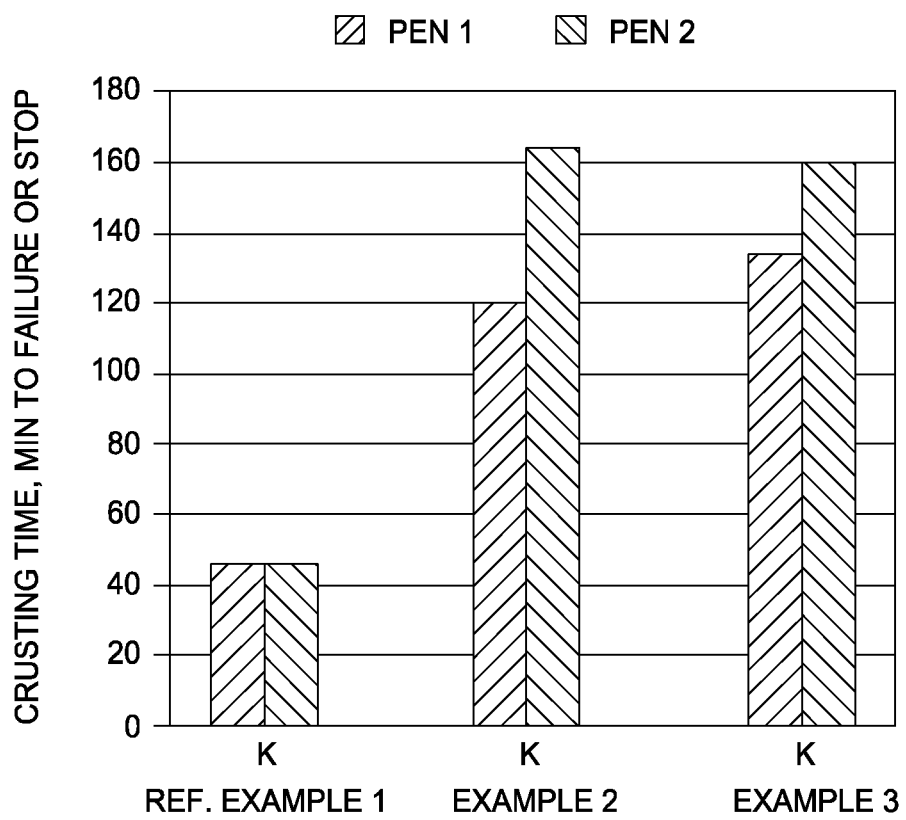
FIG. 1, on coordinates of crusting time (in minutes) and various colors, is a comparison of the crusting results of two pens, each containing colored inks, in which in one pen, N-phenylmaleimide is not present and in the other pen, N-phenylmaleimide is present, according to an example.

It is appreciated that, in the following description, numerous specific details are set forth to provide a thorough understanding of the examples. However, it is appreciated that the examples may be practiced without limitation to these specific details. In other instances, well-known methods and structures may not be described in detail to avoid unnecessarily obscuring the description of the examples. Also, the examples may be used in combination with each other.

While a limited number of examples have been disclosed, it should be understood that there are numerous modifications and variations therefrom. Similar or equal elements in the Figures may be indicated using the same numeral.

It is be noted that, as used in this specification and the appended claims, the singular forms "a," "an," and "the" include plural referents unless the context clearly dictates otherwise.

As used herein, the term "about" is used to provide flexibility to a numerical range endpoint by providing that a given value may be "a little above" or "a little below" the endpoint, and may be related to manufacturing tolerances. The degree of flexibility of this term can be dictated by the particular variable and would be within the knowledge of those skilled in the art to determine based on experience and the associated description herein. In some examples, "about" may refer to a difference of ±10%.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or subranges encompassed within that range as if each numerical value and subrange is explicitly recited. As an illustration, a numerical range of "about 1 wt % to about 5 wt %" should be interpreted to include not only the explicitly recited values of about 1 wt % to about 5 wt %, but also include individual values and sub-ranges within the indicated range. Thus, included in this numerical range are individual values such as 2, 3.5, and 4 and subranges such as from 1 to 3, from 2 to 4, and from 3 to 5, etc. This same principle applies to ranges reciting only one numerical value. Furthermore, such an interpretation should apply regardless of the breadth of the range or the characteristics being described.

Latex polymers of high $T_g$ (>100° C.) have been used for improving the printing performance. These polymers film form or lead to bigger aggregates faster at the nozzles when water gets evaporated to some extent, resulting in crusting. As a consequence, the pens have to be aggressively cleaned quite often (every 5 to 15 min) to keep the nozzles alive and that reduces the printing speed significantly. In order to overcome this, a latex polymer is desired that does not film-form at the nozzles. In addition, the minimum film-forming temperature (MFFT) of the latex has to be low (<100° C.) so that the film formation after printing can be achieved easily. The lower the MFFT, the greater the ease of film formation. Consequently, it will save the energy cost of fusing of the latex particles and increase the speed of printing. So there is a need for new latex polymers that can improve printability with more than 1 hr of continuous printing without wiping the nozzles so that printing speed can be improved significantly. The $T_g$ of the polymer has to be lowered at the same time for faster throughput and compatibility to a variety of media.

In general, the printability of the latex polymers is poor in thermal inkjet printheads. This is due to the film formation and particle size increase of latex particles, leading to clogged nozzles. These issues have been overcome by using latex polymers with high MFFT or $T_g$. Such latex polymers are used in inkjet inks for the large format printers that use vinyl media, for example. Even though high MFFT latex works better, the nozzles of the pen have had to be cleaned frequently to overcome crusting of latex polymers on the nozzles. Improved formulations have increased the cleaning frequency up to 15 min. Extending the printability to more than 1 hr of continuous printing without wiping the nozzles could significantly improve printing speed.

In accordance with the teachings herein, two solutions are provided that improve the printing performance of latex-based inks, as measured by continuous printing for more than 1 hr without wiping the nozzles. In the first case, adding N-phenylmaleimide to the ink as one of the co-monomers improves the printing performance. In the second case, providing latex polymers of narrow particle size distribution improves the printing performance. By "narrow particle size distribution" is meant a standard deviation in the particle size of less than 6% of the average particle size. Either or both solutions may be employed in the practice of the teachings herein.

I. N-Phenylmalemide (NPMI)

In accordance with the teachings herein, a latex polymer that is manufactured from a mixture of monomers, including N-phenylmaleimide (NPMI), is disclosed that has a wide range of $T_g$ to improve printability without wiping nozzles for more than 1 hr. Incorporation of NPMI improves durability also and may be present in an amount from about 1 to 10 wt % of the latex polymer. This is a significant improvement over existing latex polymers. Moreover, a variety of print media can be used to achieve the same durability. These latex polymers can be used in the inks or as binders for overcoat.

Over a number of years, novel latexes have been developed specifically for use in and compatibility with thermal inkjet pens. While the basic concepts described in the earliest patents are broad, implementation of those teachings toward making fully reliable inkjet compatible latex fell short of acceptable. The latex employed in the teachings herein may be prepared through conventional free radical addition of a monomer mixture through emulsion polymerization. Whatever may be the monomer combination, the N-phenylmaleimide (NPMI) monomer may be added in an amount in the range of about 1 to 10 wt % of the total monomer concentration. Less than about 1 wt % does not provide the benefit accorded by 1 wt % or greater, while greater than about 10 wt % results in a latex polymer that may be too rigid or powdery.

This monomer is very compatible with other monomers and polymerizes along with other monomers easily. This monomer incorporation also results in a higher molecular weight polymer than without it. A higher molecular weight polymer may result in an ink evidencing better crusting. For some combinations of monomers (without NPMI), the molecular weight of the polymer cannot be increased, since some monomers can act as chain transfer agents. But incorporation of NPMI, which is a reactive monomer, in the monomer mixture may reduce and even prevent chain transfer.

To make the polymer, a mixture of olefinic-based monomers, surfactants, water-soluble initiators, and, optionally, cationic emulsifiers, may be used. The various components are now described.

Examples of suitable monomers, in addition to NPMI, to form the polymer may be based on monomers having one or more olefinic groups and may include butyl (meth)acrylate, hexyl (meth)acrylate, 2-ethyl hexyl (meth)acrylate, octyl acrylate, n-decyl (meth)acrylate, n-dodecyl (meth)acrylate, tetradecyl (meth)acrylate, n-amyl (meth)acrylate, neopentyl (meth)acrylate, cyclopentyl (meth)acrylate, lauryl (meth) acrylate, oleyl (meth)acrylate, palmityl (meth)acrylate, and stearyl (meth)acrylate, where the term "(meth)acrylate" is intended to include both the acrylate and the methacrylate, as is well-known. Further examples of suitable monomers may include acrylic acid, methacrylic acid, maleic acid, styrene, acrylonitrile, methyl methacrylate, alpha-methyl styrene, vinyl toluene, and vinyl naphthalene.

Surfactants of ionic, non-ionic or reactive surfactants may be used in the emulsification of the monomers. Particular examples of ionic surfactants for acrylic, styrene/acrylic, and vinyl/acrylic latex synthesis may include anionic surfactants. Examples of anionic surfactants may include, but are not limited to, Rhodafac® RS 710, which is a branched alcohol ethoxylate-based phosphate ester (Rhodia Novacare); sodium dodecyl sulfate; octylphenol ethoxylates, such as TRITON X 100® (Dow Chemical Co.); and ethoxylates of alcohols, amines, amides or acids, such as LUTENSOL® AT 50 (BASF Corp.). Reactive surfactants may also be used. Examples of such reactive surfactants include MAXEMUL® 5010, 5011, 6106, and 6112 (Uniquema); HITENOL® BC-10, BC-1025, BC-20, BC-2020, and BC-30 (Montello, Inc.), NOIGEN® RN-10, RN-20, RN-30, RN-40, and RN-5065 (Montello, Inc.); sodium methallyl sulfonates; sulfopropyl acrylate; vinyl sulfonate; 2-acrylamido-2-methylpropane sulfonate sodium salt, vinyl phosphate; monosodium ethylsulfonate monododecyl maleate; sorbitol acrylate; sorbitol methacrylate; perfluoro heptoxy poly(propyloxy) methacrylate; phenoxyl poly(ethyleneoxy) acrylate; phenoxyl poly(ethyleneoxy) methacrylate; nonyl phenoxy poly (ethyleneoxy) crotanate; nonyl phenoxy poly (ethyleneoxy) fumarate; nonyl phenoxy poly (ethyleneoxy) acrylate; nonyl phenoxy poly (ethyleneoxy) methacrylate; mono dodecyl maleate; and allylsulfosuccinate derivatives, such as TREM LT-40® (Henkel).

For reliability and print properties, the amount of surfactant used in the polymerization process may be about 0.7 to 3 wt % with respect to the monomer concentration. In some examples, the amount of surfactant may be in the range of about 1 to 2.5 wt %. If the surfactant concentration is less than about 0.7 wt %, then the particle size of the latex increases, consequently adversely affecting the reliability and printability, as these particles can settle easily. On the other hand, higher surfactant concentration (greater than about 3 wt %) can lead to the formation of smaller size particles, resulting in increased viscosity, and consequently leading to poor printability.

Examples of water-soluble initiators may include, but are not limited to, potassium persulfate ($K_2S_2O_8$), ammonium persulfate, sodium persulfate, 2,2'-azobis(2-methylpropionamidine) dihydrochloride (V-50), 2,2'-azobis(isobutyramidine) dihydrochloride, 2,2'-azobis [2-methyl-N-(2-hydroxyethyl)propionamide], 2,2'-azobis{2-[1-(2-hydroxyethyl)-2-imidazolin-2-yl]propane}-dihydrochloride, 2,2'-azobis(1-imino-1-pyrrolidino-2-ethylpropane)dihydrochloride, 2,2'-azobis[2-(2-imidazolin-2-yl)propane]disulfate dihydrate, 2,2'-azobis[2-(2-imidazolin-2-yl)propane]dihydrochloride, and 2,2'-azobis [N-(2-carboxyethyl)-2-methylpropionamidine]hydrate]. The amount of initiator employed may range from about 0.2 to 5 wt % of the total mixture. In some examples, the amount of initiator may range from about 0.5 to 1.5 wt % of the total mixture.

Examples of cationic emulsifiers, if used, may include, but are not limited to, didodecyldimethylammonium bromide (DDAB) or dodecyltrimethylammonium bromide (DTAB), dimethyldioctadecylammonium bromide, dodecyldimethylethylammonium bromide, tetradecyltrimethylammonium bromide, laurylamine oxide, lauryl dimethylamine oxide, and N,N-dimethyldodecylamine-N-oxide. The concentration of the cationic emulsifier may be in the range of 0 to 3 wt %. In some examples, the amount of the cationic emulsifier(s) may be in the same range as the anionic surfactant, namely about 0.7 to 3 wt % with respect to the monomer concentration, or, in other examples, in the range of about 1 to 2.5 wt %.

The temperature of polymerization may broadly range from about 50° to just below 100°, e.g., about 90°. A lower temperature may produce a large quantity of residual monomer and the removal of such monomers may be a tedious process, particularly for latexes which involve methacrylonitrile. On the other hand, a higher temperature of polymerization may consume excess energy in processing.

Proprietary monomers may be used in this process and the process may be a semi-continuous emulsion polymerization involving free radical polymerization of monomers having olefinic groups, described above.

In some examples, a small portion, say about 2.5% of an emulsion of the monomers and surfactant, may be added to hot water followed by addition of the initiator solution. After a period of time, the remaining emulsion may be added over another period of time. The reaction may be continued for yet another period of time and then cooled to ambient temperature Once the polymerization of acrylic monomers is complete, the reactor may be cooled to ambient temperature. The latex dispersion may be neutralized with KOH to a pH value of about 8.5. These latexes may have a glass transition temperature in the range of about 60° to 140° C. Latex coagulation may be accomplished on the print media at a higher than ambient temperature, for example by heated fuser roller or exposure to IR lamp or other thermal means.

II. Narrow Particle Size Distribution

The latex polymer disclosed herein may be prepared through the same process and using the same components as described above with regard to NPMI. In this case, the monomer mix may or may not include NPMI.

However, the concentration of surfactant may be different in the addition of two portions of monomer emulsion. In the former case, described about with regard to the addition of NPMI, the concentration in the two portions of surfactant may be substantially the same, both being in the range of about 0.6 to 3.0 wt % of the monomer mix. As an example, the concentration of surfactant may be about 1.2 wt % for both portions. In the latter case, now described with regard to obtaining a narrow particle size distribution of the latex polymer particles, the concentration of the first portion of surfactant may be in the range of about 0.2 to 0.7 wt % and the concentration of the second portion of surfactant may be in the range of about 0.7 to 3.0 wt %. In some examples, the concentration of surfactant in the second portion is about twice that of the first portion. As an example, the concentration of surfactant in the first portion may be 0.6 wt % of the monomers and the concentration of surfactant in the second portion may be 1.2 wt %.

Thus, the first emulsion has less surfactant (with respect to monomers) compared to the second emulsion. It appears that a smaller amount of surfactant in the first emulsion may help in obtaining a narrower distribution of particle size.

III. Inks

Inks for jetting, particularly by thermal inkjet printing, may be formulated by combining the latex polymer (NPMI-containing, narrow size distribution, or both), colorant, surfactant, and other additives in the ranges shown below:
1 to 10 wt % latex polymer;
1 to 6 wt % colorant;
0.1 to 5 wt % surfactant;
0 to 3 wt % kogation preventer;
1 to 20 wt % humectant solvent;
0 to 20 wt % of buffering agents, anti-microbial agents, sequestering agents, viscosity modifiers, etc.; and
balance water.

The ratio of latex polymer to pigment may be in a ratio range of about 1:1 to 2:1. Below the ratio of 1:1 may result in poor durability, while greater than the ratio of 2:1 may result poor printability.

A. Latex Polymer

As noted above, the latex polymer employed in the inks disclosed herein may include a latex polymer that includes NPMI as one of the monomers used to make the polymer. Alternatively, the latex polymer employed in the inks disclosed herein may include a latex polymer having a narrow particle distribution. In particular, the particle size distribution may have a standard deviation of 6% of the average particle size. In some examples, latex polymers including NPMI and having a narrow particle size may be employed.

The concentration of the latex polymer may be in the range of about 1 to 10 wt %. In some examples, the concentration may be in the range of about 3 to 6 wt %.

B. Colorant

According to one exemplary embodiment, the present exemplary inkjet ink system includes between approximately 1 to 6 wt % colorant. Specifcally, the present exemplary inkjet ink system may include a number of anionic dyes, pigments, or dye/pigment blends.

Suitable pigments can be black pigments, white pigments, cyan pigments, magenta pigments, yellow pigments, or the like. Further, pigments can be organic or inorganic particles as is well known in the art. Suitable inorganic pigments include, for example, carbon black. However, other inorganic pigments may be suitable such as titanium oxide, cobalt blue ($CoO$—$Al_2O_3$), chrome yellow ($PbCrO_4$), and iron oxide. Suitable organic pigments include, for example, azo pigments including diazo pigments and monoazo pigments, polycyclic pigments (e.g., phthalocyanine pigments such as phthalocyanine blues and phthalocyanine greens, perylene pigments, perynone pigments, anthraquinone pigments, quinacridone pigments, dioxazine pigments, thioindigo pigments, isoindolinone pigments, pyranthrone pigments, and quinophthalone pigments), insoluble dye chelates (e.g., basic dye type chelates and acidic dye type chelate), nitropigments, nitroso pigments, and the like. Representative examples of phthalocyanine blues include copper phthalocyanine blue and derivatives thereof (Pigment Blue 15). Representative examples of quinacridones include Pigment Orange 48, Pigment Orange 49, Pigment Red 122, Pigment Red 192, Pigment Red 202, Pigment Red 206, Pigment Red 207, Pigment Red 209, Pigment Violet 19 and Pigment Violet 42. Representative examples of anthraquinones include Pigment Red 43, Pigment Red 194 (Perinone Red), Pigment Red 216 (Brominated Pyranthrone Red) and Pigment Red 226 (Pyranthrone Red). Representative examples of perylenes include Pigment Red 123 (Vermillion), Pigment Red 149 (Scarlet), Pigment Red 179 (Maroon), Pigment Red 190 (Red), Pigment Violet 19, Pigment Red 189 (Yellow Shade Red) and Pigment Red 224. Representative examples of thioindigoids include Pigment Red 86, Pigment Red 87, Pigment Red 88, Pigment Red 181, Pigment Red 198, Piment Violet 36, and Pigment Violet 38. Representative examples of heterocyclic yellows include Pigment Yellow 1, Pigment Yellow 3, Pigment Yellow 12, Pigment Yellow 13, Pigment Yellow 14, Pigment Yellow 17, Pigment Yellow 65, Pigment Yellow 73, Pigment Yellow 74, Pigment Yellow 151. Pigment Yellow 117, Pigment Yellow 128, Pigment Yellow 155, Pigment Yellow 83, Pigment Yellow 213, and Pigment Yellow 138. Such pigments are commercially available in either powder or press cake form from a number of sources including, BASF Corporation, Engelhard Corporation and Sun Chemical Corporation.

Examples of black pigments that can be used include carbon pigments. The carbon pigment can be almost any commercially available carbon pigment that provides acceptable optical density and print characteristics. Carbon pigments suitable for use in the present system and method include, without limitation, carbon black, graphite, vitreous carbon, charcoal, and combinations thereof. Such carbon pigments can be manufactured by a variety of known methods such as a channel method, a contact method, a furnace method, an acetylene method, or a thermal method, and are commercially available from such vendors as Cabot Corporation, Columbian Chemicals Company, Degussa AG, and E.I. DuPont de Nemours and Company. Suitable carbon black piments include, without limitation, Cabot pigments such as MONARCH 1400, MONARCH 1300, MONARCH 1100, MONARCH 1000, MONARCH 900, MON-ARCH 880, MONARCH 800, MONARCH 700, CAB-O-JET 200, CAB-O-JET 300, REGAL, BLACK PEARLS, ELFTEX, MOGUL, and VULCAN pigments; Columbian pigments such as RAVEN 7000, RAVEN 5750, RAVEN 5250, RAVEN 5000, and RAVEN 3500; Degussa pigments such as Color Black FW 200, RAVEN FW 2, RAVEN FW 2V, RAVEN FW 1, RAVEN FW 18, RAVEN 3160, RAVEN FW 3170, Special Black 6, Special Black 5, Special Black 4A, Special Black 4, PRINTEX U, PRINTEX 140U, PRINTEX V, and PRINTEX 140V; and TIPURE R-101 available from Dupont. The above list of pigments includes unmodified pigment particulates, small molecule attached pigment particulates, and polymer-dispersed pigment particulates.

Similarly, a wide variety of colored pigments can be used with the present system and method, therefore the following listing is not intended to be limiting. For example, colored pigments can be blue, brown, cyan, green, white, violet, magenta, red, orange, yellow, as well as mixtures thereof. The following color pigments are available from Cabot Corp.: CABO-JET 250C, CABO-JET 260M, and CABO-JET 270Y. The following color pigments are available from BASF Corp.: PALIOGEN Orange, PALIOGEN Orange 3040, PALIOGEN Blue L 6470, PALIOGEN Violet 5100, PALIOGEN Violet 5890, PALIOGEN Yellow 1520, PALIOGEN Yellow 1560, PALIOGEN Red 3871K, PALIOGEN Red 3340, HELIOGEN Blue L 6901 F, HELIOGEN Blue NBD 7010, HELIOGEN Blue K 7090, HELIOGEN Blue L 7101F, HELIOGEN Blue L6900, L7020, HELIOGEN Blue D6840, HELIOGEN Blue D7080, HELIOGEN Green L8730, HELIOGEN Green K 8683, and HELIOGEN Green L 9140. The following pigments are available from Ciba-Geigy Corp.: CHROMOPHTAL Yellow 3G, CHROMOPHTAL Yellow GR, CHROMOPHTAL Yellow 8G, IGRAZIN Yellow 5GT, IGRALITE Rubine 4BL, IGRALITE Blue BCA, MONASTRAL Magenta, MONASTRAL Scarlet, MONASTRAL Violet R, MONASTRAL Red B, and MONASTRAL Violet Maroon B. The following pigments are available from Heubach Group: DALAMAR Yellow YT-858-D and HEUCOPHTHAL Blue G XBT-583D. The following pigments are available from Hoechst Specialty Chemicals: Permanent Yellow GR, Permanent Yellow G, Permanent Yellow DHG, Permanent Yellow NCG-71, Permanent Yellow GG, Hansa Yellow RA, Hansa Brilliant Yellow 5GX-02, Hansa Yellow-X, NOVOPERM Yellow HR, NOVOPERM Yellow FGL, Hansa Brilliant Yellow 10GX, Permanent Yellow G3R-01, HOSTAPERM Yellow H4G, HOSTAPERM Yellow H3G, HOSTAPERM Orange GR, HOSTAPERM Scarlet GO, HOSTAPERM Pink E, Permanent Rubine F6B, and the HOSTAFINE series. The following pigments are available from Mobay Corp.: QUINDO Magenta, INDOFAST Brilliant Scarlet, QUINDO Red 86700, QUINDO Red 86713, and INDOFAST Violet. The following pigments are available From Sun Chemical Corp.: L74-1357 Yellow, L75-1331 Yellow, and L75-2577 Yellow. Other examples of pigments can include Normandy Magenta RD-2400, Permanent Violet VT2645, Argyle Green XP-111-5, Brilliant Green Toner GR 0991, Sudan Blue OS, PV Fast Blue B2GO1, Sudan III, Sudan II, Sudan IV, Sudan Orange G, Sudan Orange 220, Ortho Orange OR2673, Lithol Fast Yellow 0991 K, Paliotol Yellow 1840, Lumogen Yellow D0790, Suco-Gelb L1250, Suco-Yellow D1355, Fanal Pink D4830, Cinquasia Magenta, Lithol Scarlet D3700, Toluidine Red, Scarlet for Thermoplast NSD PS PA, E. D. Toluidine Red, Lithol Rubine Toner, Lithol Scarlet 4440, Bon Red C, Royal Brilliant Red RD-8192, Oracet Pink RF, and Lithol Fast Scarlet L4300. These pigments are available from commercial sources such as Hoechst Celanese Corporation, Paul Uhlich, BASF, American Hoechst, Ciba-Geigy, Aldrich, DuPont, Ugine Kuhlman of Canada, Dominion Color Company, Magruder, and Matheson. Examples of other suitable colored pigments are described in the Colour Index, 3rd edition (The Society of Dyers and Colourists, 1982).

Other pigments not specifically listed can also be suitable for use with the present exemplary system, The above-illustrated pigments can be used singly or in combination of two or more, or in combination with anionic or nonionic dyes. Typically, the pigments of the present system and method can be from about 10 nm to about 10 μm and in one aspect can be from 10 nm to about 500 nm in diameter, although sizes outside this range can be used if the pigment can remain dispersed and provide adequate color properties. In an example, the pigment can have a concentration in the range of from about 1 to about 6 wt % of the inkjet ink composition. In some examples, the concentration may be in the range of about 2.5 to 4 wt %.

The pigments may be self-dispersed pigments, such as CAB-O-JET® 200 or 300 (Cabot Corporation), where the dispersant is covalently bonded to the base color. Alternatively, the pigments may be dispersed with dispersants such as a base-soluble styrene acrylic polymer typically milled with the pure color, for example, a JONCRYL® resin (BASF), in the amount of 1 to 30% by weight of pigment.

C. Surfactant

As mentioned above, the ink vehicle may also include one or more surfactants. The surfactant may be present to lower surface tension. As an example, the ink may include non-ionic, cationic, and/or anionic surfactants, which may be present in an amount ranging from about 0.01 to 5 wt % based on the total concentration of the ink. In some examples, the surfactant may be a non-ionic surfactant, such as a silicone-free alkoxylated alcohol surfactant such as, for example, TECO® Wet 510 (Evonik Tego Chemie GmbH), present in an amount of about 0.1 to 1.0 wt % of the total ink composition, or, in another example, present in an amount of about 0.5 wt %.

D. Kogation Preventer

Kogation may be associated with thermal inkjet printing, in which a substantially flat resistor surface is used to "fire" droplets of ink in the direction of the print medium. Repeated firings of ink droplets can result in an accumulation of residue ("koga") build-up on the resistor surface. In time, kogation can adversely impact resistor firing.

Anti-kogation agents, or kogation preventers, may optionally be included in the ink formulation to prevent or reduce kogation, where ink residue builds up on surfaces of the heating element of the printer during printing. An example of a suitable kogation preventer is dextran. Other examples of anti-kogation agents include a phosphate ester based on oleyl alcohol, LIPONIC™ EGI (Lipo Chemicals, Inc.), polyethylene glycol, glucose, and methoxypolyethylene glycol. The kogation preventer, if present, may be in the concentration of about 0.01 to 3 wt %.

E. Humectant Solvent

A humectant solvent may be added to keep the firing nozzles from drying out. An example of a suitable humectant solvent is 2-hydroxyethyl-2-pyrrolidone (HEP). Other suitable humectants may include tetraethylene glycol, Dantocol™ DHE (Lonza Inc.), and other similar substituted pyrrolidones. The humectant solvent may be present in an amount of about 1 to 20 wt % of the total ink composition. In some examples, the concentration of the humectant solvent may be about 12 wt %.

The minimum film-forming temperature of the latex polymer is in the range of about 60 to 80° C.; HEP lowers the minimum film-forming temperature to below 50° C. for fast film-forming on the print medium. On a large web press operating at 400 ft/min, it may be important to dry the ink before the printed print medium is spooled up so as to avoid ink smearing.

F. Other Components

The inkjet ink composition may also include any number of buffering agents, anti-microbial agents, sequestering agents, and viscosity modifiers. Any number of commonly known buffers may be used to establish a desired pH level in the inkjet ink system. Additionally, various anti-microbial agents can be used to inhibit growth of undesirable microorganisms. Suitable antimicrobial agents may include biocides and fungicides, which are routinely used in ink formulations and fixer formulations. Several examples of suitable anti-microbial agents may include, but are not limited to, benzoate salts, sorbate salts, commercial products such as NUOSEPT (ISP), UCARCIDE (Dow), VANCIDE (RT Vanderbilt Co.), and PROXEL (Aveda) and other known biocides. Examples of suitable fungicides may include Kordek™ MLX (Rohm & Haas) and Biohan™ CS-1246 (Dow Chemical), Typically, such anti-microbial agents may be present in a range of about 0.05 to 2 wt %. In an example, the ink may include a total amount of antimicrobial agents that ranges from about 0.1 wt % to about 0.25 wt %.

Sequestering agents, such as EDTA (ethylene diamine tetra acetic acid), may be included to eliminate the deleterious effects of heavy metal impurities, and buffer solutions may be used to control the pH of the ink. From 0 to 2 wt %, for example, can be used. Viscosity modifiers may also be present, as well as other additives known to those skilled in the art to modify properties of the ink as desired. Such additives can be present in an amount ranging from 0 to 20 wt %.

G. Water

As mentioned above, the balance of the present inkjet ink composition includes water.

IV. Cationic Fixing Fluid

A cationic fixing fluid may also be associated with the present exemplary inkjet ink system configured to fix the ink on a desired substrate. According to an example, the cationic fixing fluid may be a solution composition that comprises a liquid vehicle and a "crashing agent." According to one example, the liquid vehicle combined with the crashing agent may be configured to be chemically stable, and can be configured for inkjet printing. The crashing agent can be a cationic polymer, a multivalent metal ion or ionic group, and/or an organic acid. The crashing agent is typically configured to precipitate with at least one compositional component of an associated inkjet ink (to be overprinted or underprinted on a substrate therewith). The compositional component that precipitates with the crashing agent can be an anionic dye or a polymer, for example.

According to one example, the fixer composition can be stored separately from the inkjet ink, and the fluid dispensing system can be configured for overprinting or underprinting the fixer composition with respect to the inkjet ink. Further, the inkjet ink disclosed herein and the cationic fixer fluid can be present in two separate inkjet pens, or alternatively, can be present in two separate reservoirs of a common inkjet pen.

According to another example, the crashing agent included in the cationic fixing fluid may be any single chemical or combination of chemicals in a fixer composition that can facilitate the desolubilization or precipitation of one or more component(s) of an inkjet ink. Precipitation of the anionic dye can impact the waterfastness of the inkjet image. Precipitation of non-colorants, such as an-ionic surfactants, can provide advantages in bleed control. The desolubilizing can be accomplished by proton transfer from collision or close proximity of the crashing agent with the colorant and/or another inkjet ink component, or alternatively, the desolubilizing can be accomplished by component associations induced by the crashing agent and/or component associations occurring with the crashing agent. Other crashing or reaction mechanisms can also occur.

As mentioned, according to an example, the crashing agent may be a cationic polymer, a multivalent ion or ionic group, or an acid, for example. Many possible crashing agents within these categories, or others, can be used to crash one or more components of the inkjet ink. For example, if the crashing agent is a cationic polymer, it can be one or more of polyvinylpyridines, poly-alkylaminoethyl acrylates, polyalkylaminoethyl methacrylates, poly(vinyl imidazole), polyethyleneimines, polybiguanides, polyguanides, polyvinylamines, polyallylamines, polyacrylamines, polyacrylamides, polyquaternaryamines, cationic polyurethanes, aminocelluloses, and/or polysaccharide amines.

Alternatively, if the crashing agent includes a multivalent ion or ionic group, it can be provided by one or more of multivalent metal salts (such as aluminum nitrate, calcium chloride, and magnesium nitrate), EDTA salts, phosphonium halide salts, organic acids, and/or other monovalent salts.

Further, according to an example, If the crashing agent is an acid, it can be provided by one or more of succinic acid, glycolic acid, citric acid, nitric acid, hydrochloric acid, phosphoric acid, sulfuric acid, polyacrylic acid, acetic acid, malonic acid, maleic acid, ascorbic acid, glutaric acid, furnaric acid, tartaric acid, lactic acid, nitrous acid, boric acid, carbonic acid, carboxylic acids such as formic acid, chloroacetic acid, dichloroacetic acid, trichloroacetic acid, fluoroacetic acid, trimethylacetic acid, methoxyacetic acid, mercaptoacetic acid, propionic acid, butyric acid, valeric acid, caproic acid, caprylic acid, capric acid, lauric acid, myristic acid, palmitic acid, stearic acid, oleic acid, rinolic acid, rinoleic acid, cyclohexanecarboxylic acid, phenylacetic acid, benzoic acid, o-toluic acid, m-toluic acid, p-toluic acid, o-chlorobenzoic acid, m-chlorobenzoic acid, p-chlorobenzoic acid, o-bromobenzoic acid, m-bromobenzoic acid, p-bromobenzoic acid, o-nitrobenzoic acid, m-nitrobenzoic acid, p-nitrobenzoic acid, oxalic acid, adipic acid, phtnalic add, isophthalic acid, terephthalic acid, salicylic acid, p-hydrobenzoic acid, anthranilic acid, m-aminobenzoic acid, p-aminobenzoic acid, benzenesulfonic acid, rnethyibenzenesuifonic acid, ethylbenzenesulfonic acid, dodecylbenzenesulfonic acid, 5-sulfosalicylic acid, 1-suifonaphthalene, hex-anesulfonic acid, octanesulfonic acid, dodecanesuifonic acid, amino acids such as glycine, aianine, valine, α-aminobutyric acid, α-aminobutryic acid, α-alanine, taurine, serine, α-amino-n-caproic acid, leucine, norleucine, and/or phenylalanine.

In an example, the fixer fluid may include about 6 to 8 wt % calcium proprionate, about 12 wt % ethylene glycol, and the balance water. The pH may be adjusted to about 6.5. Such a fixer fluid may be printed on plain paper or magazine stock, for example.

It is to be understood that this disclosure is not limited to the particular process steps and materials disclosed herein because such process steps and materials may vary somewhat. It is also to be understood that the terminology used herein is used for the purpose of describing particular examples only. The terms are not intended to be limiting because the scope of the present disclosure is intended to be limited only by the appended claims and equivalents thereof.

EXAMPLES

Example 1 (Reference)

Latex Polymer with Conventional Monomers

A proprietary latex polymer was prepared and included a mixture of monomers having at least one olefinic group, including acrylic monomers, prepared by free radical emulsion polymerization. Such latex polymers are used in latex-based inks in HP 789 and HP 792 Designjet Ink Cartridges. The weight average molecular weight of the latex polymer was found to be 239,000. The $T_g$ of this latex was 106° C.

I. N-phenylmaleimide (NPMI)

Example 2

Incorporation of NPMI Monomer in a Latex Polymer

The latex polymer from Reference Example 1 was prepared, but with the introduction of 5 wt % of NPMI. The process described in Ref. Example 1 was followed, in which the 5 wt % of the acrylic monomers were replaced with NPMI monomer in the monomer mix. The weight average molecular weight of the resulting latex polymer was found to be 522,000. This increased molecular weight resulted from the incorporation of NPMI, keeping other process conditions the same, such as the amount of initiator, surfactant, addition rate of emulsion, reaction time, and reaction temperature. The $T_g$ of this latex polymer was 85° C.

In particular, a mixture of acrylic monomers including 5% of NPMI monomer was made. It was emulsified with water using the emulsifier HITENOL® BC1025 having the monomer content of 79.2%. About 2.5% of this emulsion was added to hot water (138% of total emulsion) followed by the initiator solution. After 30 min, the remaining emulsion was added over a period of 5 h. The reaction was continued for another 2 h and then cooled to ambient temperature. This mixture was neutralized with potassium hydroxide solution to bring the pH of the latex to 8.5. This was filtered with a 200 micron size filter to obtain the latex in about 30 to 40% by weight.

Example 3

Incorporation of NPMI Monomer in the Latex Polymer

Another latex polymer was also made by scaling up the Example 2 latex at least four fold under similar conditions. The $T_g$ of this latex polymer was also 85° C. Both latex polymers performed very close to each other in all the properties, including particle size.

Example 4

Inks Made with Latex Polymers—Without and with NPMI

Inkjet inks with these latex polymers from Reference Example 1 and Examples 2 and 3 were formulated under similar concentrations and tested, using a standard testing protocol. Two different pens were used for printing to confirm the results. In this case, black inks ("K") were compared to each other. The concentration of black pigment in the ink was 3.0 wt % in all cases.

The nozzles of the pen were almost blocked within 45 min for the ink formulated with the latex polymer from Reference Example 1. On the other hand, the ink formulated with latex from Example 2 printed more than 160 min in one case, and all inks containing a latex polymer that included NPMI showed crusting in 120 min or more.

The crusting result obtained is illustrated in FIG. 1. This indicates that the pens with the latex particulates containing NPMI monomer print very well. The print parameters such as turn-on energy, drop velocity and decap, were all almost the same for all inks. The durability tests performed with these inks were almost the same. These results indicate the crusting is significantly improved for the latex of this invention. Inkjet inks made from the latex polymer of Example 3 behaved much the same as the inkjet inks made from the latex polymer of Example 2.

Figure 2:
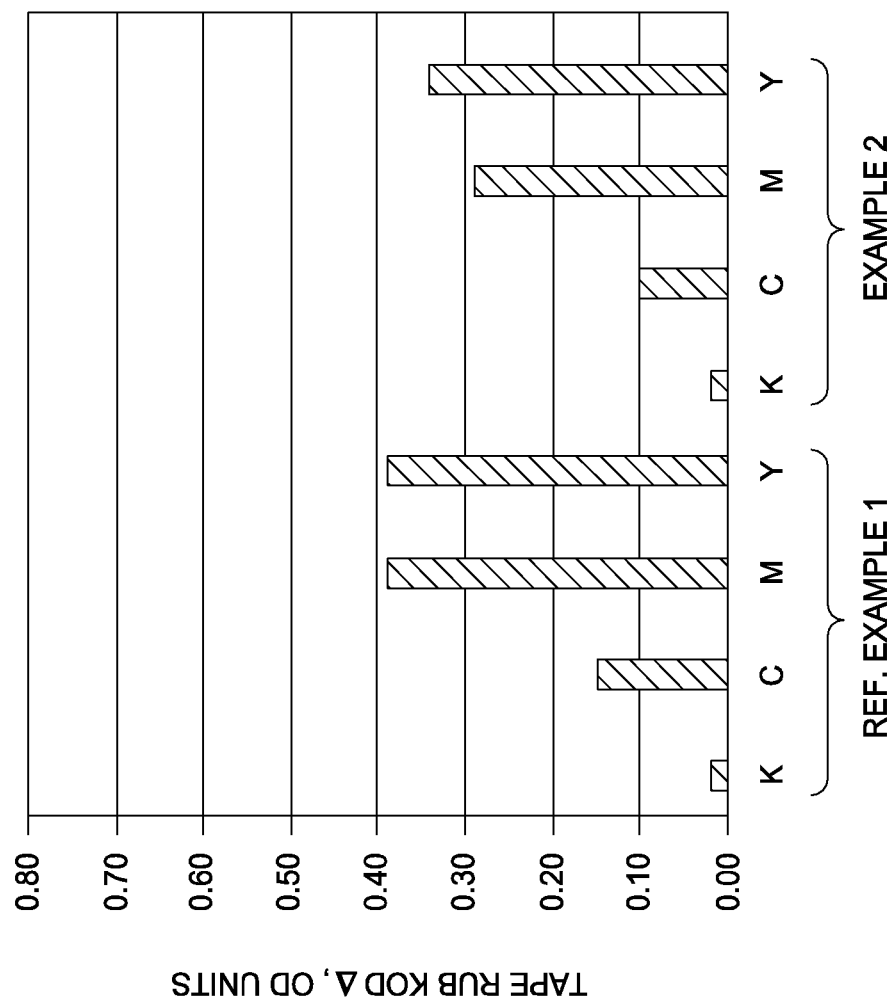
FIG. 2, on coordinates of 60° gloss for various colors, depicts the durability results of inks containing N-phenylmaleimide in comparison to other inks not containing N-phenylmaleimide, according to an example.
Figure 3:
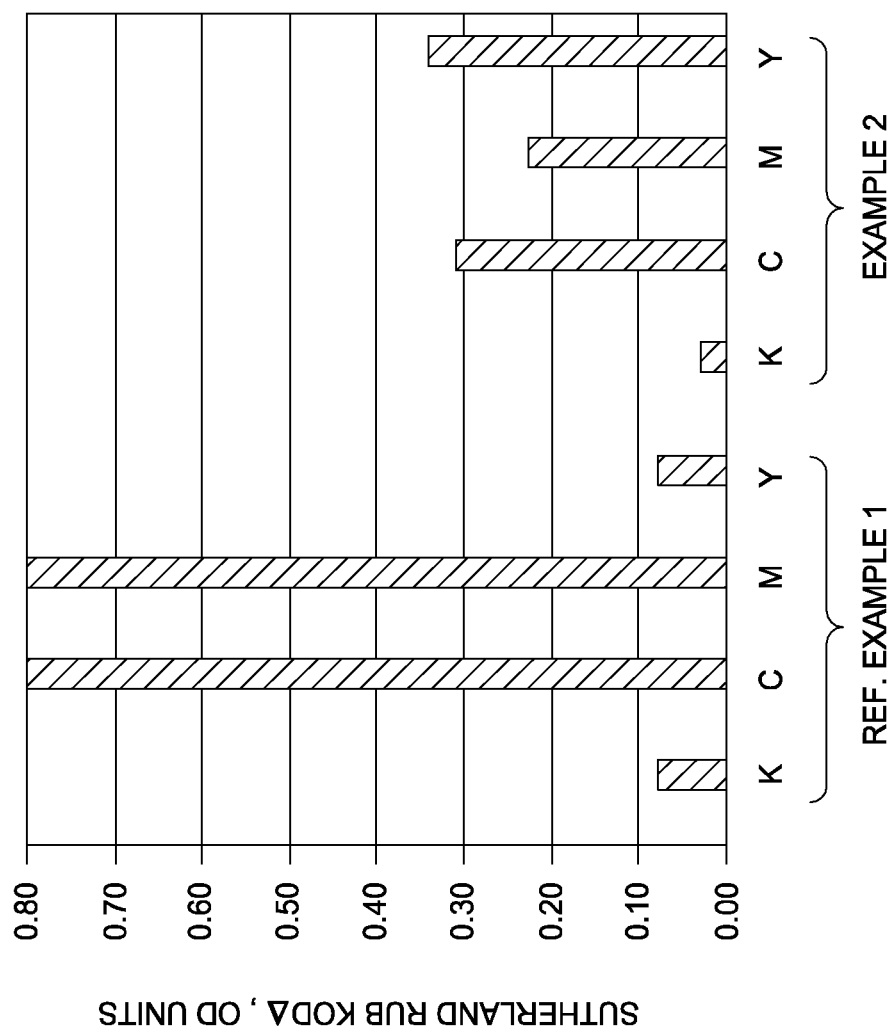
FIG. 3, on coordinates of Sutherland rub for various colors, depicts the durability results of inks containing N-phenylmaleimide in comparison to other inks not containing N-phenylmaleimide, according to an example.
Figure 4:
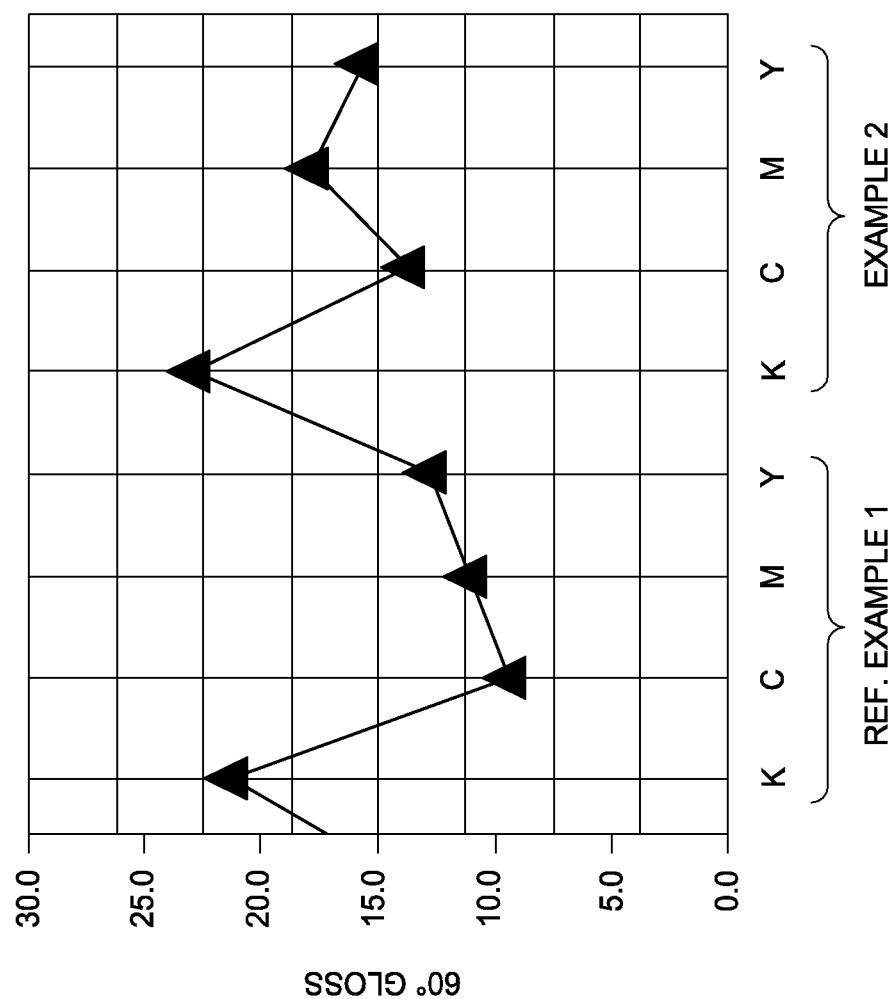
FIG. 4, on coordinates of tape adhesion for various colors, depicts the durability results of inks containing N-phenylmaleimide in comparison to other inks not containing N-phenylmaleimide, according to an example.

The results of durability tests performed on inks containing these latex polymers containing NPMI are illustrated in FIGS. 2-4. In each example, fixer was printed first and then ink. The fixer was a solution of calcium proprionate, ethylene glycol, and water. The print media in each case was STERLING® Ultra Gloss (available from NewPage Corp.)

FIG. 2 is a plot of tape rub for Ref. Example 1 and Example 2 for four different inks: black ("K"), cyan ("C"), magenta ("M"), and yellow ("Y"). In tape rub, the lower the number the better. The inks of Example 2 are seen to be the same or better than the inks of Reference Example 1.

FIG. 3 is a plot of Sutherland rub for Ref. Example 1 and Example 2 for the four different inks. Again, as with tape rub, the lower the number the better. The inks of Example 2 are seen to be the same or better than the inks of Reference Example 1, other than the yellow ink.

FIG. 4 is a plot of 60° gloss for Ref. Example 1 and Example 2 for the four different inks. In this case, a minimum value of 20 is desired. The inks of Example 2 are seen to be the better than the inks of Reference Example 1 in all cases.

II. Particle Size Distribution

Example 5

Making Latex Polymers with Narrow Particle Size Distribution

The process described in Example 2 was followed with the acrylic monomers used in the Example 1. The only difference was that the amount of emulsifier used in the 2.5% of emulsion part was one half of the amount used (the ratio with respect to the monomers) in the rest of the emulsion. For this case, two separate emulsions were made.

A mixture of acrylic monomers used in Example 1 was made. Two emulsions were prepared. In the first, 2.5% of the monomers was emulsified with water using the emulsifier Hitenol BC1025 (0.6% of monomers). In the second, the remaining monomer mix was emulsified with Hitenol BC1025 (1.2% of monomer mix). The first emulsion was added to hot water (138% of total emulsion) followed by the initiator solution. After 30 min, the remaining emulsion was added over a period of 5 hr. The reaction was continued for another 2 hr and then cooled to ambient temperature. This mixture was neutralized with potassium hydroxide solution to bring the pH of the latex to 8.5. This was filtered with 200 micron size filter to obtain the latex in about 30 to 40% by weight.

Example 6 (Reference)

Latex Polymer Having a Conventional Particle Size Distribution

Figure 5:
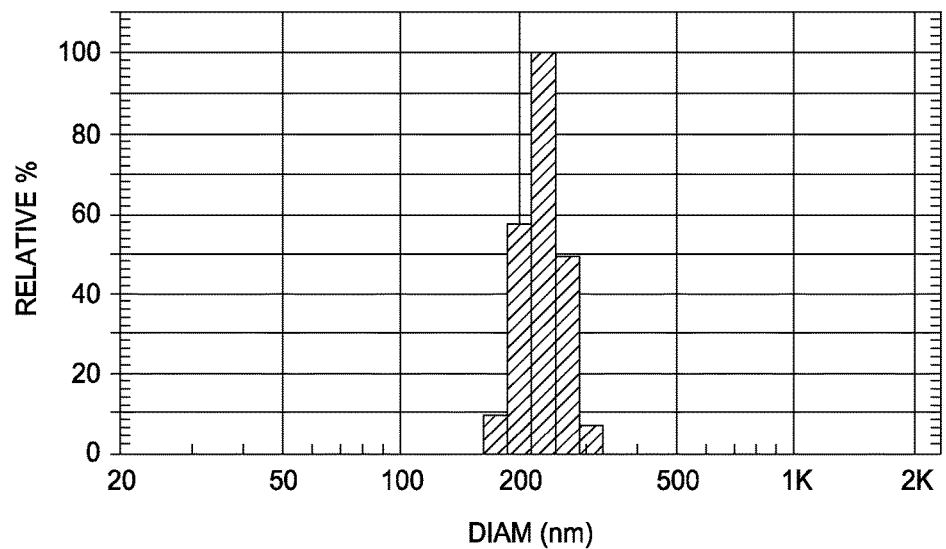
FIG. 5, on coordinates of particle size distribution (in relative percent) and particle size (in diameter), is a plot of particle size distribution of a large format printer latex ink, according to an example.

The particle size distribution of the latex polymer used in a printer ink, such as made by Reference Example 1, is shown in FIG. 5. The particle size was measured using a Nicomp Particle System and determined to have a mean diameter of 232.3 nm, with a Coefficient of Variation of 0.128 and a Standard Deviation of 29.740 nm, or 12.8% of the average particle size. This shows that a broad distribution of particle size is present in this latex polymer.

Example 7

Latex Polymer Having Narrow Particle Size Distribution

Figure 6:
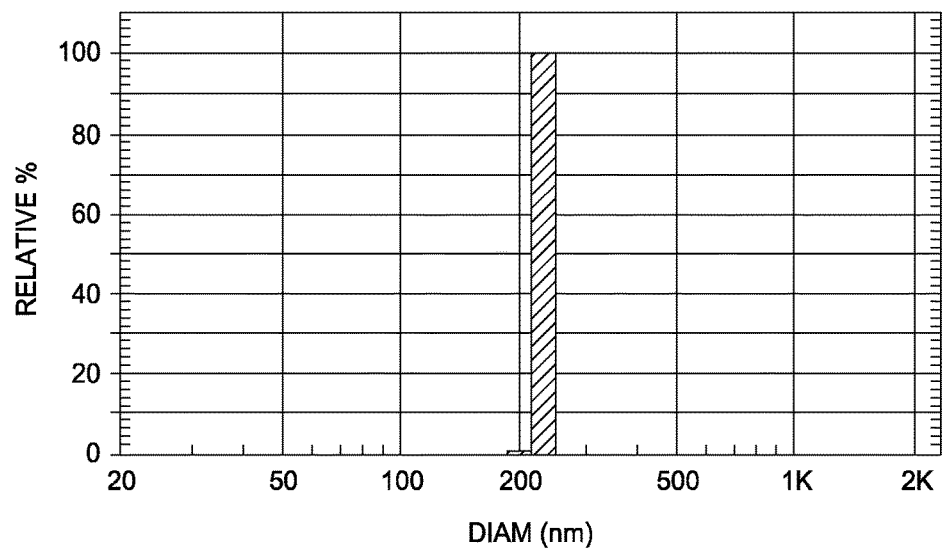
FIG. 6, on coordinates of particle size distribution (in relative percent) and particle size (in diameter), is a plot of particle size distribution of a latex polymer having a narrow particle size distribution, according to an example.

The particle size distribution of the latex polymer formed in Example 5 is shown in FIG. 6. The particle size was also measured using a Nicomp Particle System and determined to have a mean diameter of 230.7 nm, with a Coefficient of Variation of 0.0.046 and a Standard Deviation of 10.613 nm, or 4.6% of the average particle size.

Example 8

Inks Made with Latex Polymers Having Different Particle Size Distributions

Inkjet inks with latex polymers from Reference Example 1 and Example 5 were formulated under similar concentrations and tested, using a standard testing protocol. The nozzles of the pen were almost blocked within 15 min for the ink formulated with the latex from Reference Example 1. At the same time, the ink formulated with the latex from Example 5 printed for more than 60 min before crusting. This indicates that the pen with the latex particulates with narrow size distribution prints very well compared to the ink with the latex having a broad distribution of particle sizes. The print parameters such as turn-on energy, drop velocity, and decap are all almost the same for both inks. The durability tests performed with these inks were almost the same. These results indicate the crusting is significantly improved for the inks containing a latex polymer having a narrow particle size distribution.

Comments on Examples.

Continuous printing may be assured for more than an hour using either the NPMI-containing latex polymer or the latex polymer with narrow particle size distribution. Durability may be improved compared to the previous latex inks because of the lower $T_g$ latex (<100° C.). Durability improvement may be achieved with a variety of media for lower $T_g$ latex polymers. Improved performance may reduce the cost of the ink significantly. Customer experience can be improved as well, since a variety of media can be used with a faster throughput. Higher throughput with different media and lower energy for fusing latex particles is usually desired in the thermal inkjet industry.

The preparation cost is same as the previous latex inks since the same monomer set is used and the process is also very similar to the previous inks. The cost of the ink may increase slightly due to the cost of NPMI as that of previous inks but the printing speed is increased significantly so that the nozzles do not have to be cleaned every 15 min. Printing speed of greater than 60 min without cleaning nozzles is ensured, while keeping other parameters the same or better. Durability is also improved, since a lower $T_g$ latex can be obtained that can print better. A wide variety of print media can be used with the inks disclosed herein.

Based on the foregoing examples, it is expected that combining Example 2 (addition of NPMI to the mix of monomers) and Example 5 (narrow particle size distribution of the latex polymer) may result in an ink having even further improved properties than those described in Examples 4 and 8.

Thus, incorporation of NPMI monomer up to 10 wt % increases the printability and durability. In addition, the $T_g$ of the polymer was also reduced from greater than 100° C. for the reference latex to 85° C. for the latex that includes NPMI. In general, as $T_g$ is lowered, the printability is also lowered. But in this case, the printability is improved with the presence of NPMI. This is a significant improvement over all other latex polymers synthesized previously.

What is claimed is:

1. A printing ink having improved printing performance, the ink including either:
   a latex polymer derived from a monomer mixture consisting of:
      about 1 to 10 wt % of N-phenylmaleimide,
      about 0.7 to 3 wt % surfactant, and
      a monomer selected from the group consisting of butyl (meth)acrylate, hexyl (meth)acrylate, 2-ethyl hexyl (meth)acrylate, octyl acrylate, n-decyl (meth)acrylate, n-dodecyl (meth)acrylate, tetradecyl (meth)acrylate, n-amyl (meth)acrylate, neopentyl (meth)acrylate, cyclopentyl (meth)acrylate, lauryl (meth)acrylate, oleyl (meth)acrylate, palmityl (meth)acrylate, stearyl (meth)acrylate, acrylic acid, methacrylic acid, maleic acid, styrene, acrylonitrile, methyl methacrylate, alpha-methyl styrene, vinyl toluene, and vinyl naphthalene and mixtures thereof; or
   a latex polymer having a narrow particle size distribution that has a standard deviation of less than about 6% of average particle size, or both, wherein the ink may be continuously printed for more than 1 hr without crusting.

2. The ink of claim 1 comprising:
   1 to 10 wt % latex polymer;
   1 to 6 wt % colorant;
   0.1 to 5 wt % surfactant;
   0 to 3 wt % kogation preventer;
   1 to 20 wt % humectant solvent;

0 to 20 wt % of buffering agents and anti-microbial agents, sequestering agents, and viscosity modifiers; and balance water.

3. The ink of claim 2, wherein the colorant is selected from the group consisting of anionic dyes, pigments, and dye/pigment blends.

4. The ink of claim 2, wherein the surfactant is a non-ionic surfactant, present in an amount of about 0.1 to 1.0 wt %.

5. The ink of claim 2, wherein the kogation preventer is present in an amount of about 0.01 to 3 wt %.

6. The ink of claim 2, wherein the humectant solvent is 2-hydroxyethyl-2-pyrrolidone.

7. A method of manufacturing an ink having improved printing performance, the method including formulating the ink using either:
   a latex polymer derived from a monomer mixture consisting of:
      1 to 10 wt % of N-phenylmaleimide,
      about 0.7 to 3 wt % surfactant, and
      a monomer selected from the group consisting of butyl (meth)acrylate, hexyl (meth)acrylate, 2-ethyl hexyl (meth)acrylate, octyl acrylate, n-decyl (meth)acrylate, n-dodecyl (meth)acrylate, tetradecyl (meth)acrylate, n-amyl (meth)acrylate, neopentyl (meth)acrylate, cyclopentyl (meth)acrylate, lauryl (meth)acrylate, oleyl (meth)acrylate, palmityl (meth)acrylate, stearyl (meth)acrylate, acrylic acid, methacrylic acid, maleic acid, styrene, acrylonitrile, methyl methacrylate, alpha-methyl styrene, vinyl toluene, and vinyl naphthalene and mixtures thereof; or
   a latex polymer having a narrow particle size distribution that has a standard deviation of less than 6% of the average particle size, or both, wherein the ink may be continuously printed for more than 1 hr without crusting.

8. The method of claim 7, wherein a mixture of the monomers used to make the latex polymer includes N-phenylmaleimide.

9. The method of claim 8, wherein the latex polymer is derived from the monomer mixture surfactants, water-soluble initiators, and, optionally, cationic emulsifiers, which are subjected to emulsion polymerization involving free radical polymerization.

10. The method of claim 9, wherein the surfactant is an anionic surfactant.

11. The method of claim 7, wherein the latex polymer having the narrow particle size distribution is made by providing two portions of the monomer and surfactant, in which the concentration of surfactant in a first portion of monomer and surfactant may be in the range of about 0.2 to 0.7 wt % based on the total mixture and the concentration of surfactant in a second portion of monomer and surfactant may be in the range of about 0.7 to 3.0 wt % based on the total mixture, and adding the first portion of monomer and surfactant to hot water, followed by addition of the water-soluble initiator, then after a period of time, adding the second portion of monomer and surfactant over another period of time, continuing the reaction for yet another period of time, and then cooling the mixture to ambient temperature.

12. The method of claim 11, wherein the concentration of surfactant in the second portion is about twice that of the surfactant in the first portion.

13. A latex polymer for an inkjet ink, the latex polymer being either:
   derived from a monomer mixture consisting of:
      about 1 to 10 wt % of N-phenylmaleimide,
      about 0.7 to 3 wt % surfactant, and
      a monomer selected from the group consisting of butyl (meth)acrylate, hexyl (meth)acrylate, 2-ethyl hexyl (meth)acrylate, octyl acrylate, n-decyl (meth)acrylate, n-dodecyl (meth)acrylate, tetradecyl (meth)acrylate, n-amyl (meth)acrylate, neopentyl (meth)acrylate, cyclopentyl (meth)acrylate, lauryl (meth)acrylate, oleyl (meth)acrylate, palmityl (meth)acrylate, stearyl (meth)acrylate, acrylic acid, methacrylic acid, maleic acid, styrene, acrylonitrile, methyl methacrylate, alpha-methyl styrene, vinyl toluene, and vinyl naphthalene and mixtures thereof; or
   having a narrow particle size distribution that has a standard deviation of less than about 6% of average particle size, or both.

14. The latex polymer of claim 13 having a glass transition temperature of less than 100° C.

15. A method of manufacturing an ink having improved printing performance, the method including formulating the ink using a latex polymer having a narrow particle size distribution that has a standard deviation of less than 6% of the average particle size wherein the ink may be continuously printed for more than 1 hr without crusting, wherein the latex polymer having the narrow particle size distribution is made by providing two portions of monomer and surfactant, in which the concentration of surfactant in a first portion of monomer and surfactant is in the range of about 0.2 to 0.7 wt % based on the total mixture and the concentration of surfactant in a second portion of monomer and surfactant is in the range of about 0.7 to 3.0 wt % based on the total mixture, and adding the first portion of monomer and surfactant to hot water, followed by addition of the water-soluble initiator, then after a period of time, adding the second portion of monomer and surfactant over another period of time, continuing the reaction for yet another period of time, and then cooling the mixture to ambient temperature.

16. The method of claim 15, wherein the concentration of surfactant in the second portion is about twice that of the surfactant in the first portion.

* * * * *